(12) United States Patent
Ogawa et al.

(10) Patent No.: US 9,876,389 B2
(45) Date of Patent: Jan. 23, 2018

(54) POWER CONTROL SYSTEM AND SOLAR POWER GENERATION SYSTEM

(71) Applicant: Panasonic Intellectual Property Management Co., Ltd., Osaka (JP)

(72) Inventors: Yuuki Ogawa, Osaka (JP); Kazunori Kidera, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 212 days.

(21) Appl. No.: 14/432,490

(22) PCT Filed: Sep. 24, 2013

(86) PCT No.: PCT/JP2013/005620
§ 371 (c)(1),
(2) Date: Mar. 31, 2015

(87) PCT Pub. No.: WO2014/054243
PCT Pub. Date: Apr. 10, 2014

(65) Prior Publication Data
US 2015/0295451 A1     Oct. 15, 2015

(30) Foreign Application Priority Data
Oct. 2, 2012   (JP) ................................ 2012-220458

(51) Int. Cl.
*H02J 7/35* (2006.01)
*H02J 3/38* (2006.01)
(Continued)

(52) U.S. Cl.
CPC .............. *H02J 7/35* (2013.01); *H01M 16/00* (2013.01); *H02J 3/12* (2013.01); *H02J 3/383* (2013.01);
(Continued)

(58) Field of Classification Search
CPC ...................................... H02J 9/00; H02J 9/04
(Continued)

(56) References Cited

U.S. PATENT DOCUMENTS

2009/0302681 A1    12/2009  Yamada et al.
2011/0210694 A1*   9/2011   Uehashi .................... H02J 3/32
                                                                     320/101
(Continued)

FOREIGN PATENT DOCUMENTS

JP    S56-091630      7/1981
JP    2008-48544 A    2/2008
(Continued)

OTHER PUBLICATIONS

International Search Report for corresponding International Application No. PCT/JP2013/005620 dated Dec. 3, 2013.
(Continued)

*Primary Examiner* — Rexford Barnie
*Assistant Examiner* — Joseph Inge
(74) *Attorney, Agent, or Firm* — Renner, Otto, Boisselle & Sklar, LLP

(57) ABSTRACT

A solar power generation system includes: a solar power generation module; a power converter for solar power generation configured to convert DC power generated by the solar power generation module into AC power; a storage battery unit; a charge and discharge controller configured to take out the AC power obtained through conversion by the power converter 3 for solar power generation from an isolated operation mode terminal, convert the AC power into DC power, and to store the DC power in the storage battery unit. A controller detects input power taken out from the isolated operation mode terminal and inputted into the charge and discharge controller, acquires generated power generated by the solar power generation module, and lowers (Continued)

the input power inputted into the charge and discharge controller when a differential between the acquired generated power and the detected input power is not greater than a predetermined value.

4 Claims, 2 Drawing Sheets

(51) Int. Cl.
*H01M 16/00* (2006.01)
*H02J 3/12* (2006.01)
*H02J 7/00* (2006.01)
*H01M 10/44* (2006.01)

(52) U.S. Cl.
CPC ............. *H02J 7/007* (2013.01); *H01M 10/44* (2013.01); *Y02E 10/563* (2013.01); *Y02E 10/566* (2013.01)

(58) Field of Classification Search
USPC .......................................................... 307/66
See application file for complete search history.

(56) References Cited

U.S. PATENT DOCUMENTS

| 2011/0210695 | A1* | 9/2011 | Kubo | H01M 10/44 |
| | | | | 320/107 |
| 2012/0059527 | A1* | 3/2012 | Beaston | H01M 10/441 |
| | | | | 700/295 |
| 2014/0062202 | A1 | 3/2014 | Yamada et al. | |

FOREIGN PATENT DOCUMENTS

| JP | 2008-090672 A | | 4/2008 |
| JP | 2008090672 A | * | 4/2008 |
| JP | 3178526 U | | 8/2012 |
| WO | WO2012124130 A1 | | 9/2012 |

OTHER PUBLICATIONS

Form PCT/ISA/237 for corresponding International Application No. PCT/JP2013/005620 dated Dec. 3, 2013.
Official Office Action dated Apr. 25, 2017 in the counterpart European patent application No. 13843755.3, dated Apr. 25, 2017.

* cited by examiner

POWER CONTROL SYSTEM AND SOLAR POWER GENERATION SYSTEM

TECHNICAL FIELD

The present invention relates to a power control system and a solar power generation system which control power input.

BACKGROUND ART

Patent Literature 1 given below describes a technique of supplying power generated by a solar power generation module to a load or another power supply system. Patent Literature 1 describes that a voltage instruction unit of the solar power generation module sets a voltage value which enables the output of maximum power. Based on this setting, output voltage from the solar power generation module is detected. Output voltage from a converter is controlled by comparing the detected output voltage from the solar power generation module and the set voltage value.

Meanwhile, the solar power generation system sometimes goes into an overload condition where output power taken out from a power conditioner connected to the solar power generation module becomes greater than the generated power generated by the solar power generation module. A problem with the solar power generation system is that once this condition occurs, the solar power generation module comes to a halt. Once the solar power generation system comes to a halt, the solar power generation system needs to be reactivated manually.

The present invention has been made with the foregoing situation taken into consideration. An object of the present invention is to provide a power control system and a solar power generation system which are capable of inhibiting the solar power generation system from coming to a halt due to the occurrence of the overload condition.

CITATION LIST

Patent Literature

Patent Literature 1: Japanese Patent Application Publication No. Sho 56-091630

SUMMARY OF INVENTION

A power control system according to a first aspect of the present invention is a power control system for a solar power generation system including: a solar power generation module; a power converter configured to convert DC power generated by the solar power generation module into AC power; a storage battery; and a charge controller configured to take out the AC power obtained through conversion by the power converter from an isolated operation mode terminal provided to the power converter, convert the AC power into DC power, and to store the DC power in the storage battery. The power control system includes: power detecting means for detecting input power taken out from the isolated operation mode terminal and inputted into the charge controller; generated power acquiring means for acquiring generated power generated by the solar power generation module; and controlling means for lowering the input power inputted into the charge controller when a differential between the generated power acquired by the generated power acquiring means and the input power detected by the power detecting means is not greater than a predetermined value.

A power control system according to a second aspect of the present invention is the power control system according to the first aspect, in which the controlling means controls the input power inputted into the charge controller in a way that the differential is kept at a constant value.

A power control system according to a third aspect of the present invention is the power control system according to the second aspect, in which the constant value is set at a value which does not allow the power converter to enter into an overload condition, and which makes it possible to take out an amount of generated power generated by the solar power generation module in a maximum extent.

A solar power generation system according to a fourth aspect of the present invention includes: a solar power generation module; a power converter configured to convert DC power generated by the solar power generation module into AC power; a storage battery; a charge controller configured to take out the AC power obtained through conversion by the power converter from an isolated operation mode terminal provided to the power converter, convert the AC power into DC power, and to store the DC power in the storage battery; power detecting means for detecting input power taken out from the isolated operation mode terminal and inputted into the charge controller; generated power acquiring means for acquiring generated power generated by the solar power generation module; and controlling means for lowering the input power inputted into the charge controller when a differential between the generated power acquired by the generated power acquiring means and the input power detected by the power detecting means is not greater than a predetermined value.

DESCRIPTION OF EMBODIMENTS

Figure 1:
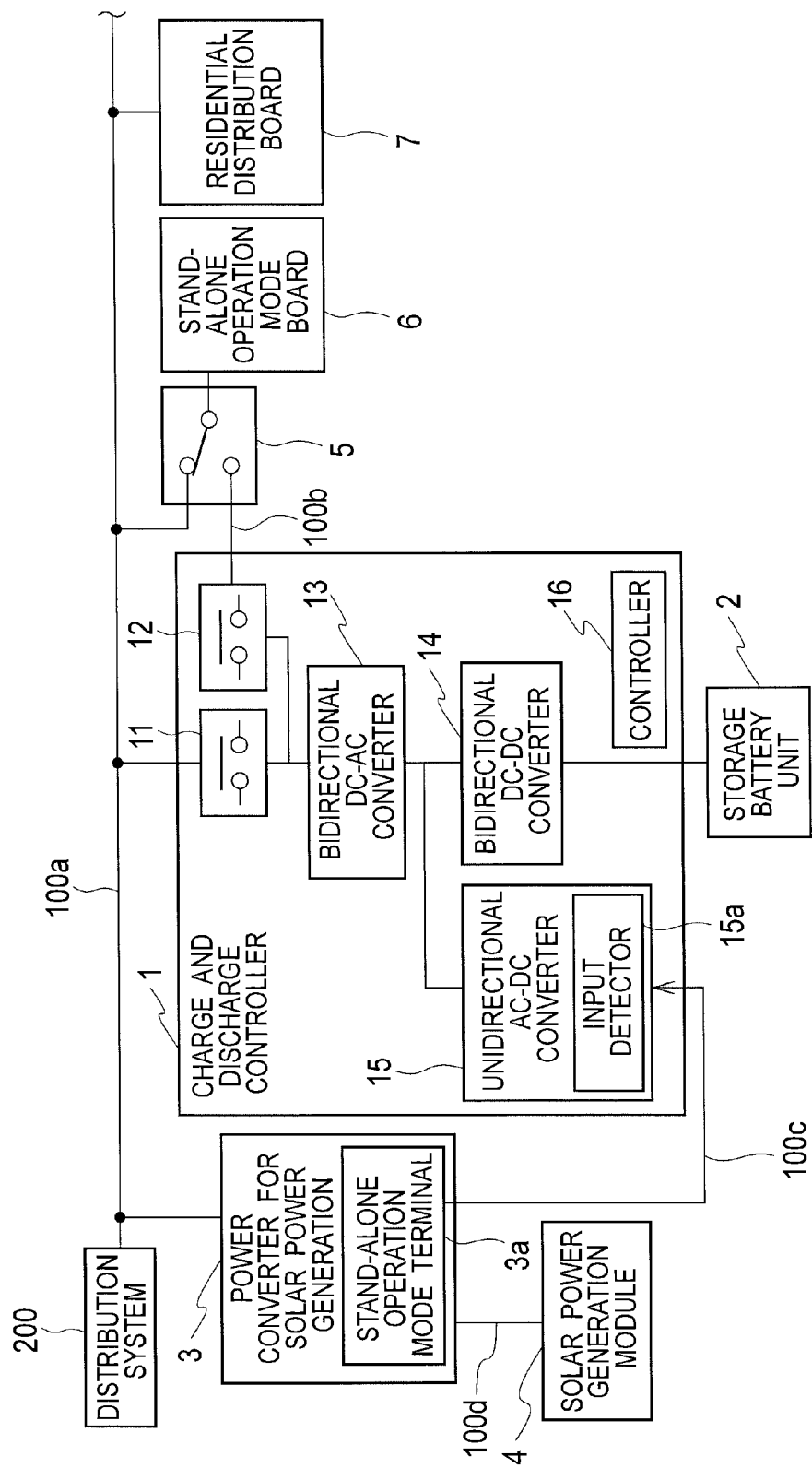
FIG. 1 is a block diagram illustrating a configuration of a solar power generation system shown as an embodiment of the present invention.

Referring to the drawings, descriptions will be hereinbelow provided for an embodiment of the present invention.

A solar power generation system shown as the embodiment of the present invention is configured as illustrated in FIG. 1, for example. This solar power generation system generates power using a solar power generation module 4 installed on a residential building, for example. The solar power generation system stores the generated power in a storage battery. In addition, the solar power generation system supplies the generated power to various appliances in the residential building.

This solar power generation system includes a charge and discharge controller (charge controller) 1, a storage battery unit 2, a power converter 3 for solar power generation, the solar power generation module 4, a switchboard 5, an isolated operation mode board 6, and a residential distribution board 7. The solar power generation module 4 and a distribution system 200 are connected to a power bus 100*a*.

The solar power generation system is supplied with system power from the distribution system 200.

The solar power generation system is capable of supplying the system power and the generated power generated by the solar power generation module 4 to the various appliances in the residential building. In addition, the solar power generation system is capable of storing the system power and the generated power in the storage battery unit 2. Furthermore, the solar power generation system is capable of supplying the stored power stored in the storage battery unit 2 to the various appliances in the residential building.

The various appliances in the residential building are connected to the isolated operation mode board 6 and the residential distribution board 7. The various appliances in the residential building are powered by DC power supplied from the isolated operation mode board 6 or the residential distribution board 7.

The solar power generation module 4 absorbs the sunlight (energy), and coverts it into electrical energy. The solar power generation module 4 generates the DC power in accordance with the intensity of the sunlight. The power converter 3 for solar power generation takes out the DC power obtained through conversion from the solar power generation module 4 via a power bus 100d.

The power converter 3 for solar power generation is what is called a power conditioner. The power converter 3 for solar power generation coverts the DC power as the generated power generated by the solar power generation module 4 into AC power. Regardless of how the generated power generated by the solar power generation module 4 fluctuates, the power converter 3 for solar power generation converts the generated power into AC power of 100 V, for example. The power converter 3 for solar power generation is capable of supplying the AC power obtained through conversion to the residential distribution board 7 via the power bus 100a.

The power converter 3 for solar power generation is provided with an isolated operation mode terminal 3a which is connectable to the charge and discharge controller 1 via a power bus 100c. The isolated operation mode terminal 3a is capable of outputting a power of 1500 W with an AC voltage of 100 V, for example. While the isolated operation mode terminal 3a is connected to the charge and discharge controller 1 via the power bus 100c, the power converter 3 for solar power generation supplies the AC power to the charge and discharge controller 1.

The switchboard 5 is connected to the power bus 100a and the charge and discharge controller 1. While in an isolated operation mode, the switchboard 5 enables electrical conduction to be made between the charge and discharge controller 1 and the isolated operation mode board 6 via a power bus 100b. The isolated operation mode is an operation mode in which the operation is performed without using the system power in case of power failure or the like. In addition, the switchboard 5 enables electrical conduction to be made between the power bus 100a and the isolated operation mode board 6.

The charge and discharge controller 1 controls the charging and discharging of the storage battery unit 2. The charge and discharge controller 1 includes a system relay 11, an isolated operation mode relay 12, a bidirectional DC-AC converter 13, a bidirectional DC-DC converter 14, a unidirectional AC-DC converter 15, and a controller (controlling means) 16.

The system relay 11 is connected to the distribution system 200 and the various appliances in the residential building via the power bus 100a. The system relay 11 is further connected to the bidirectional DC-AC converter 13. The system relay 11 is opened and closed under the control of the controller 16.

The isolated operation mode relay 12 is connected to the switchboard 5 and the bidirectional DC-AC converter 13. The isolated operation mode relay 12 is opened and closed under the control of the controller 16.

The bidirectional DC-AC converter 13 is connected to the system relay 11, the isolated operation mode relay 12, the bidirectional DC-DC converter 14 and the unidirectional AC-DC converter 15. The bidirectional DC-AC converter 13 converts DC power supplied from the bidirectional DC-DC converter 14 or the unidirectional AC-DC converter 15 into AC power. The bidirectional DC-AC converter 13 supplies the AC power obtained through conversion to the system relay 11 and the isolated operation mode relay 12. The bidirectional DC-AC converter 13 converts the system power supplied from the system relay 11 into DC power. The bidirectional DC-AC converter 13 supplies the DC power obtained through conversion to the bidirectional DC-DC converter 14.

The bidirectional DC-DC converter 14 is connected to the bidirectional DC-AC converter 13, the unidirectional AC-DC converter 15 and the storage battery unit 2. The bidirectional DC-DC converter 14 is supplied with the DC power from the bidirectional DC-AC converter 13 or the unidirectional AC-DC converter 15. The bidirectional DC-DC converter 14 converts the supplied DC power into DC power of a voltage suitable to charge the storage battery unit 2. The bidirectional DC-DC converter 14 stores the DC power obtained through conversion in the storage battery unit 2. The bidirectional DC-DC converter 14 is supplied with DC power discharged from the storage battery unit 2. The bidirectional DC-DC converter 14 converts the supplied DC power into DC power of a voltage suitable for the bidirectional DC-AC converter 13. The bidirectional DC-DC converter 14 supplies the DC power with the converted voltage to the bidirectional DC-AC converter 13.

The unidirectional AC-DC converter 15 receives the AC power (input power) via the isolated operation mode terminal 3a of the power converter 3 for solar power generation, and a power bus 100c. The unidirectional AC-DC converter 15 converts the received AC power into the DC power. The unidirectional AC-DC converter 15 supplies the DC power obtained through conversion to the bidirectional DC-DC converter 14.

The unidirectional AC-DC converter 15 is provided with an input detector (power detecting means) 15a. The input detector 15a detects a value of the input power taken out from the isolated operation mode terminal 3a. The input detector 15a supplies the value of the detected input power to the controller 16. Incidentally, the function of detecting the input power will be described by referring to FIG. 2.

The controller 16 controls the operations of the respective components of the charge and discharge controller 1. When the generated power is stored in the storage battery unit 2, the controller 16 takes out the input power from the isolated operation mode terminal 3a. The controller 16 stores the taken-out input power as the generated power in the storage battery unit 2 via the unidirectional AC-DC converter 15 and the bidirectional DC-DC converter 14.

When the system power is stored in the storage battery unit 2, the controller 16 turns on the system relay 11. The controller 16 stores the system power in the storage battery unit 2 via the bidirectional DC-AC converter 13 and the bidirectional DC-DC converter 14.

When set into the isolated operation mode due to power failure or the like, the controller 16 turns on the isolated operation mode relay 12. Thereby, the controller 16 supplies the generated power of the solar power generation module 4 to the switchboard 5 via the isolated operation mode relay 12. Otherwise, when set into the isolated operation mode due to power failure or the like, the controller 16 turns on the isolated operation mode relay 12. Thereby, the controller 16 is capable of supplying the stored power of the storage battery unit 2 to the switchboard 5 via the isolated operation mode relay 12 as well.

The thus-configured solar power generation system is likely to cause an overload condition where the input power inputted into the charge and discharge controller 1 from the isolated operation mode terminal 3a becomes greater than the generated power of the solar power generation module 4. In this case, the power converter 3 for solar power generation is forced into a shut-out condition where the operation of the power converter 3 for solar power generation comes to a halt.

In order to inhibit the occurrence of the shut-out condition, the solar power generation system monitors the input power from the isolated operation mode terminal 3a using the input detector 15a. Furthermore, the controller 16 monitors the generated power generated by the solar power generation module 4. Generated power monitoring means is designed such that the controller 16 acquires sensor signals generated by a sensor provided to the solar power generation module 4, a sensor provided to the power converter 3 for solar power generation, and the like (generated power acquiring means).

The controller 16 judges whether a differential between the acquired generated power and the input power detected by the input detector 15a is not greater than a predetermined value. Thereby, the controller 16 judges whether or not there is likelihood of the overload condition where the input power becomes greater than the generated power. When judging that the differential obtained by subtracting the input power from the generated power is not greater than the predetermined value, the controller 16 lowers the input power inputted into the charge and discharge controller 1 (controlling means). The input detector 15a and the controller 16 like these function as a power controlling system configured to control the input power from the isolated operation mode terminal 3a.

Figure 2:
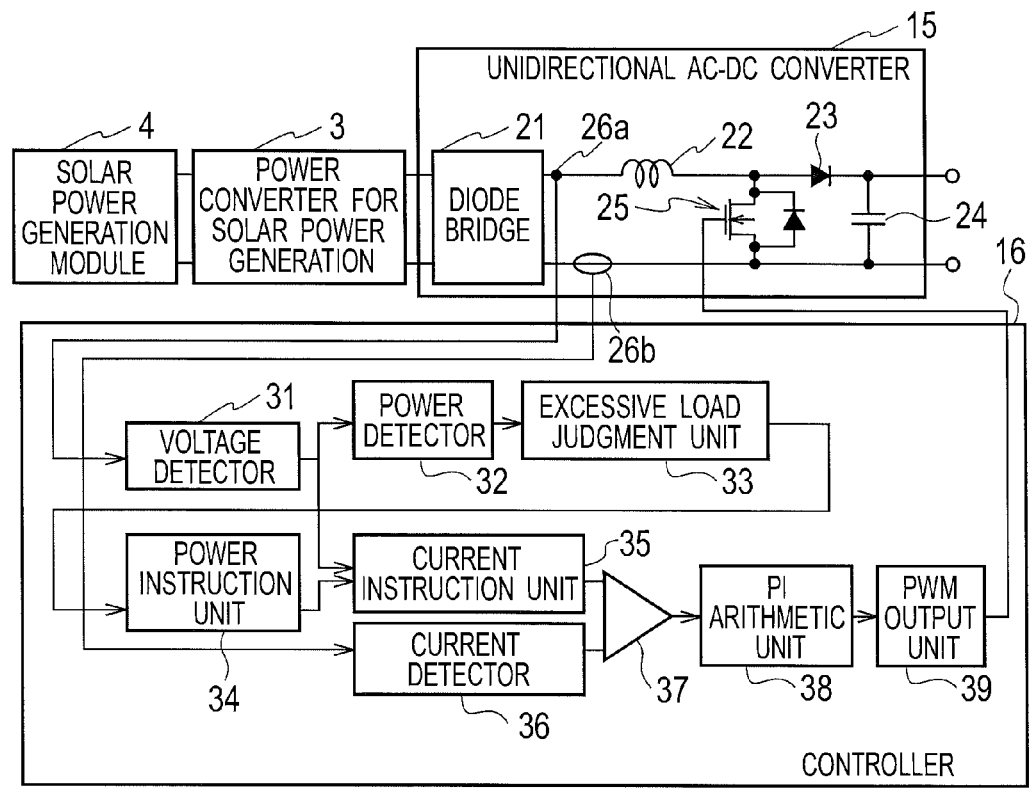
FIG. 2 is a block diagram illustrating configurations of a unidirectional AC-DC converter and a controller in the solar power generation system shown as the embodiment of the present invention.

For the purpose of controlling the input power, the unidirectional AC-DC converter 15 and the controller 16 have their respective configurations, for example, as shown in FIG. 2.

The unidirectional AC-DC converter 15 is connected to the solar power generation module 4 and the power converter 3 for solar power generation. The unidirectional AC-DC converter 15 includes a diode bridge 21, a coil 22, a diode 23, a capacitor 24 and a semiconductor switch 25. The unidirectional AC-DC converter 15 further includes a voltage sensor 26a and a current sensor 26b.

The diode bridge 21 performs full-wave rectification on the AC power (input power) supplied from the power converter 3 for solar power generation. Furthermore, the coil 22, the diode 23 and the capacitor 24 smooth the resultant AC power (input power).

The semiconductor switch 25 turns on and off in accordance with a PWM signal supplied from the controller 16. Thereby, the unidirectional AC-DC converter 15 converts the AC power supplied from the isolated operation mode terminal 3a into the DC power with a desired voltage.

The controller 16 includes: a voltage detector 31 connected to the voltage sensor 26a; a power detector 32; an overload judgment unit 33; a power instruction unit 34; a current instruction unit 35; a current detector 36; a differential amplifier 37; a PI arithmetic unit 38; and a PWM output unit 39.

The voltage detector 31 detects a voltage value of the input power taken out from the power converter 3 for solar power generation depending on a sensor output from the voltage sensor 26a. The voltage detector 31 supplies the detected voltage value to the power detector 32 and the current instruction unit 35.

The power detector 32 detects the input power taken out from the isolated operation mode terminal 3a. The power detector 32 detects the input power at predetermined intervals of time. The detected input power is supplied to the overload judgment unit 33.

The overload judgment unit 33 compares the differential between the generated power and the input power with the predetermined value. Thereby, the overload judgment unit 33 judges whether or not the input power taken out from the isolated operation mode terminal 3a into the charge and discharge controller 1 is a value indicating the likelihood of the overload condition where the input power becomes greater than the amount of generated power generated by the solar power generation module 4.

Figure 3:
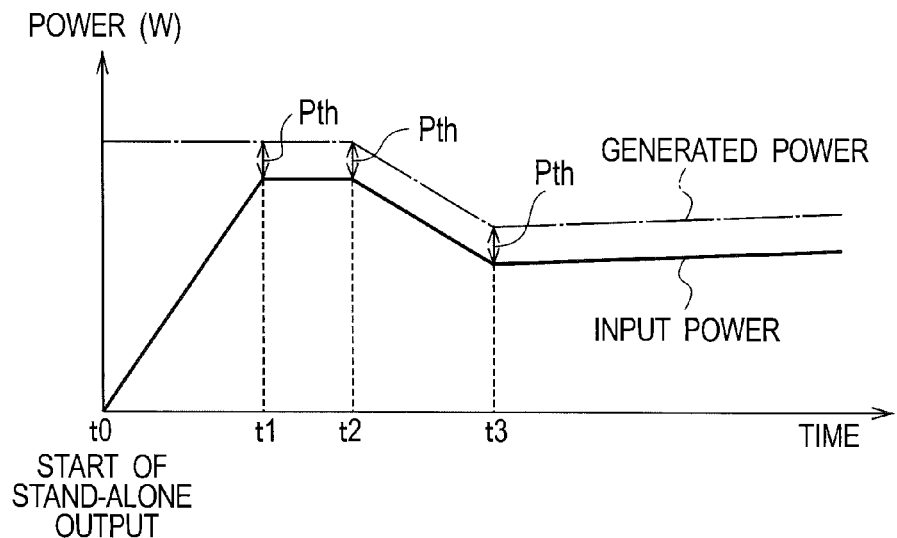
FIG. 3 is a diagram illustrating a relationship between generated power and input power in the solar power generation system shown as the embodiment of the present invention.

Let us assume that as shown in FIG. 3, for example, under a condition where the generated power generated by the solar power generation module 4 fluctuates, the taking out of the input power from the isolated operation mode terminal 3a is stared at time t0, and the input power is increased gradually. Subsequently, the input power from the isolated operation mode terminal 3a becomes closer to the generated power. Thereafter, once the differential between the generated power and the input power reaches a predetermined value Pth at time t1, this state can be detected by the overload judgment unit 33 of the controller 16. In this case, the overload judgment unit 33 judges that there is likelihood that the increase in the input power results in the overload condition. Once the overload judgment unit 33 judges that there is likelihood of the overload condition, the overload judgment unit 33 supplies a power generation shortage signal to the power instruction unit 34.

The power instruction unit 34 generates a power instruction value indicating an instruction on the DC power to be outputted from the unidirectional AC-DC converter 15. In general, the power instruction unit 34 outputs the power instruction value suitable for the bidirectional DC-AC converter 13 or the bidirectional DC-DC converter 14 to the current instruction unit 35.

Based on the voltage value detected by the voltage detector 31 and the power instruction value outputted from the power instruction unit 34, the current instruction unit 35 outputs a current instruction value. From a sensor output supplied from the current sensor 26b, the current detector 36 detects a current value of the input power taken out from the isolated operation mode terminal 3a.

The differential amplifier 37 outputs the differential between the current instruction value supplied from the current instruction unit 35 and the current value supplied from the current detector 36.

The PI arithmetic unit 38 performs proportional (P) arithmetic and integration (I) arithmetic in order to decrease the differential outputted from the differential amplifier 37.

Based on the result of the arithmetic performed by the PI arithmetic unit 38, the PWM output unit 39 changes a duty ratio at which the semiconductor switch 25 is turned on and off, and supplies the PWM signal to the semiconductor switch 25. Thereby, the PWM output unit 39 converts the AC power supplied from the isolated operation mode terminal 3a into a desired DC power.

Once supplied with the power generation shortage signal from the overload judgment unit 33, the power instruction unit 34 outputs a power instruction value for lowering the input power from the isolated operation mode terminal 3a. In response to this, the current instruction unit 35 lowers the current instruction value. In response to this, the PI arithmetic unit 38 and the PWM output unit 39 decrease the duty ratio of the PWM signal to be given to the semiconductor switch 25. Thereby, the controller 16 lowers the DC power to be outputted from the unidirectional AC-DC converter 15, and lowers the input power from the isolated operation mode terminal 3a.

As described above, the solar power generation system is capable of lowering the input power before the occurrence of the overload condition even if the input power from the isolated operation mode terminal 3a becomes closer to the generated power generated by the solar power generation module 4. For this reason, the solar power generation system is capable of inhibiting itself from coming to a halt due to the occurrence of the overload condition. Thereby, the solar power generation system is capable of inhibiting the necessity for the solar power generation system to be reactivated manually or the like.

In addition, it is desirable that the controller 16 control the input power to be inputted into the charge and discharge controller 1 in a way that the differential between the generated power and the input power is kept at the predetermined constant value (Pth).

For example, the controller 16 is designed such that when as shown in FIG. 3, the generated power generated by the solar power generation module 4 fluctuates, the controller 16 inputs input power, which is smaller than the generated power by the constant value, into the charge and discharge controller 1 from the power converter 3 for solar power generation. In this case, the controller 16 supplies the acquired generated power to the power instruction unit 34. The power instruction unit 34 uses a power value, which is smaller than the acquired generated power by the constant value (Pth), as the power instruction value.

Thereby, the PWM output unit 39 is capable of operating the semiconductor switch 25 in order to control the input power. For this reason, this solar power generation system is capable of inhibiting the occurrence of the overload condition even if the condition of the sunlight decreases the generated power. Incidentally, when the frequency of the overload condition intends to be lowered, this constant value (Pth) may be set at a larger value.

Furthermore, it is desirable that the constant value for the controller 16 be set at a value which does not allow the power converter 3 for solar power generation to enter into the overload condition, and which makes it possible to take out an amount of generated power generated by the solar power generation module 4 to a maximum extent.

Let us assume that for example, knowledge is already available about a range in which the generated power likely fluctuates for a predetermined length of time due to a change in the sunlight incident upon the solar power generation module 4, and a range in which the input power can be adjusted by the unidirectional AC-DC converter 15 of the charge and discharge controller 1 within the predetermined length of time. In this case, the constant value is set in a way that the range in which the input power can be adjusted within the predetermined length of time becomes larger than the range in which the generated power likely fluctuates for the predetermined length of time.

This makes it possible to inhibit the occurrence of the overload condition, and to take out the amount of generated power generated by the solar power generation module 4 to a maximum extent.

It should be noted that the foregoing embodiment is an example of the present invention. For this reason, the present invention is not limited to the foregoing embodiment. It is a matter of course that depending on designs and the like, various modifications leading to other embodiments may be made within a scope not departing from the technical idea about the present invention.

The entire contents of Japanese Patent Application No. 2012-220458 (filed on Oct. 2, 2012) are incorporated herein by reference.

INDUSTRIAL APPLICABILITY

According to the present invention, in response to the drop in the power inputted into the charge and discharge controller from the isolated operation mode terminal, the present invention lowers the input power from the isolated operation mode terminal. For this reason, the present invention is capable of inhibiting the solar power generation system from coming to a halt due to the occurrence of the overload condition.

REFERENCE SIGNS LIST

1 charge and discharge controller
2 storage battery unit
3 power converter for solar power generation
3a isolated operation mode terminal
4 solar power generation module
4 unidirectional AC-DC converter
15a input detector
16 controller
21 diode bridge
25 semiconductor switch
31 voltage detector
32 power detector
33 overload judgment unit
34 power instruction unit
35 current instruction unit
36 current detector
37 differential amplifier
38 PI arithmetic unit
39 PWM output unit

The invention claimed is:

1. A power control system for a solar power generation system including:
   a solar power generation module;
   a power converter configured to convert DC power generated by the solar power generation module into AC power;
   a storage battery; and
   a charge controller configured to receive the AC power from an isolated operation mode terminal of the power converter, convert the AC power into DC power, and to store the DC power in the storage battery, the power control system comprising:
- power detecting unit configured to detect input power received from the isolated operation mode terminal and inputted into the charge controller;
- generated power acquiring unit configured to acquire a measurement of generated power generated by the solar power generation module; and
- controlling unit configured to lower the input power inputted into the charge controller when a differential between the measurement of generated power acquired by the generated power acquiring unit and the input power detected by the power detecting unit is not greater than a predetermined value.

2. The power control system according to claim 1, wherein the controlling unit controls the input power inputted into the charge controller in a way that the differential is kept at a constant value.

3. The power control system according to claim 2, wherein the constant value is set at a value which does not allow the power converter to enter into an overload condition, and which makes it possible to take out an amount of generated power generated by the solar power generation module to a maximum extent.

4. A solar power generation system comprising:
- a solar power generation module;
- a power converter configured to convert DC power generated by the solar power generation module into AC power;
- a storage battery;
- a charge controller configured to receive the AC power from an isolated operation mode terminal of the power converter, convert the AC power into DC power, and to store the DC power in the storage battery,
- power detecting unit configured to detect input power received from the isolated operation mode terminal and inputted into the charge controller;
- generated power acquiring unit configured to acquire a measurement of generated power generated by the solar power generation module; and
- controlling unit configured to lower the input power inputted into the charge controller when a differential between the measurement of generated power acquired by the generated power acquiring unit and the input power detected by the power detecting unit is not greater than a predetermined value.

* * * * *